US008951176B2

(12) United States Patent
Sgarabottolo

(10) Patent No.: US 8,951,176 B2
(45) Date of Patent: Feb. 10, 2015

(54) TOOL CHANGING DEVICE FOR A CUTTING HEAD OF A MACHINE FOR CUTTING FLAT GLASS SHEETS

(75) Inventor: Silvano Sgarabottolo, Foshan (CN)

(73) Assignee: Newtech-Engineering S.r.l. (IT)

( * ) Notice: Subject to any disclaimer, the term of this patent is extended or adjusted under 35 U.S.C. 154(b) by 408 days.

(21) Appl. No.: 13/504,179

(22) PCT Filed: Oct. 27, 2010

(86) PCT No.: PCT/EP2010/066256
§ 371 (c)(1),
(2), (4) Date: Apr. 26, 2012

(87) PCT Pub. No.: WO2011/051335
PCT Pub. Date: May 5, 2011

(65) Prior Publication Data
US 2012/0214654 A1  Aug. 23, 2012

(30) Foreign Application Priority Data
Oct. 28, 2009  (IT) .............................. PD2009A0315

(51) Int. Cl.
*B23Q 3/157* (2006.01)
*C03B 33/027* (2006.01)
*C03B 33/10* (2006.01)

(52) U.S. Cl.
CPC .......... *B23Q 3/15706* (2013.01); *C03B 33/027* (2013.01); *C03B 33/10* (2013.01)
USPC .................................. 483/55; 483/66; 483/61

(58) Field of Classification Search
CPC ........... B23Q 3/15505; B23Q 3/15566; B23Q 3/15706
USPC ................. 483/54, 55, 56, 57, 58, 60, 61, 66; 409/235; 408/234; 29/560
See application file for complete search history.

(56) References Cited

U.S. PATENT DOCUMENTS

| | | | | |
|---|---|---|---|---|
| 4,355,446 A | * | 10/1982 | Shimajiri et al. | 29/26 A |
| 4,610,074 A | * | 9/1986 | Katsube et al. | 483/54 |
| 4,614,020 A | * | 9/1986 | Kawada et al. | 483/4 |
| 5,161,424 A | * | 11/1992 | Saberton et al. | 74/409 |
| 5,381,713 A | | 1/1995 | Smith | |
| 2002/0197124 A1 | * | 12/2002 | Kitamura et al. | 409/235 |

FOREIGN PATENT DOCUMENTS

| | | |
|---|---|---|
| EP | 0970924 A2 | 1/2000 |
| JP | 61050735 A * | 3/1986 |
| KR | 1020060076209 A | 7/2006 |
| WO | 9323216 A1 | 11/1993 |

OTHER PUBLICATIONS

International Search Report; International Patent Application PCT/EP2010/066256; International Application Filing Date Oct. 27, 2010; Mail date Dec. 21, 2010.
Written Opinion; International Patent Application PCT/EP2010/066256; International Application Filing Date Oct. 27, 2010; Mail date Dec. 21, 2010.

* cited by examiner

*Primary Examiner* — Erica E Cadugan
*Assistant Examiner* — Michael Vitale
(74) *Attorney, Agent, or Firm* — Cantor Colburn LLP

(57) ABSTRACT

A tool changing device for a cutting head of a machine for cutting flat glass sheets, the tool changing device comprising: a bridge; a carriage for supporting the cutting head, the carriage being slidingly attached to the bridge for translation along the bridge; an electric motor that provides for translational motion of the carriage with respect to the bridge; and a tool supporting slider, which is configured to support a plurality of tools such that the tools can be automatically exchanged between the tool supporting slider and the cutting head, the tool supporting slider coupled, by way of reversible fixing elements to the cutting head supporting carriage during work by the cutting head, and wherein the tool supporting slider is uncoupled from the cutting head supporting carriage during tool changing operations.

9 Claims, 6 Drawing Sheets

TOOL CHANGING DEVICE FOR A CUTTING HEAD OF A MACHINE FOR CUTTING FLAT GLASS SHEETS

TECHNICAL FIELD

The present invention relates to a tool changing device for a cutting head of a machine for cutting flat glass sheets.

BRIEF DISCUSSION OF RELATED ART

Currently known machines for cutting flat glass sheets generally have a resting surface for a glass sheet to be worked, and associated with such resting surface is a bridge, which is motorized in order to travel its length, and which carries a cutting head, which in its turn is motorized for translational motion on such bridge.

The cutting head has a wheel tool at its end, such tool comprising a body, to which the cutting wheel, which in the sector jargon is called "clip" is hinged, such body being shaped so as to reversibly engage in a corresponding seat on the end of the cutting head.

Depending on the type and thickness of the glass sheet, the use of a dedicated and specific cutting wheel is in fact necessary, so that for each type of sheet the most correct cutting of the glass will be performed.

Since, on the work surface, sheets of different thicknesses and types can follow each other, it is necessary that the substitution of the cutting wheels can be rapid, and indeed the clip tool is easy to remove and apply, even if it is done manually.

Some of the current glass cutting machines known today are provided with tool changing devices, which however limit the tool changing position to a specific region of the cutting area, thus forcing the dimensions of the machine and the paths of the working axes to be increased, as well as lengthy tool changing operations, even if these are automatic, and which in the end are not very functional, given that the tool changing position is arrived at electronically with the interpolation of two axes without mechanical alignment.

Moreover, these machines with tool changing devices have been shown to be difficult to maintain and economically disadvantageous, while limiting the productivity of the machine itself owing to a cycle time that is too long.

BRIEF SUMMARY

The aim of the present invention is to provide a tool changing device for a cutting head of a machine for cutting flat glass sheets, which is capable of overcoming the drawbacks in known types of tool changing devices.

Within this aim, the invention provides a tool changing device that makes it possible to eliminate fruitless idle excursions to arrive at the tool changing region, so improving the production rates of the cutting machine of which it is a part.

The invention further provides a tool changing device with which clip tools of a per se known type can be associated.

The invention also is intended to devise a tool changing device that is rapid, exact and has a low cost.

The invention further provides a tool changing device for a cutting head of a machine for cutting flat glass sheets, which can be produced using known technologies and equipment.

This is achieved by a tool changing device for a cutting head of a machine for cutting flat glass sheets, characterized in that it comprises, so that they can slide in a parallel arrangement with means for sliding on a bridge that supports the cutting head, a carriage for supporting a cutting head, with motorization means for translational motion on said bridge, a tool supporting slider, which is normally coupled, by way of reversible fixing means, to said head supporting carriage during the work of said cutting head and which can be uncoupled, for tool changing operations, in order to allow the movement of said carriage with respect to said slider, which is stationary, to select a tool to be used.

BRIEF DESCRIPTION OF THE DRAWINGS

Further characteristics and advantages of the invention will become better apparent from the following detailed description of a preferred, but not exclusive, embodiment of the tool changing device according to the invention, illustrated, by way of non-limiting example, in the accompanying drawings, wherein.

DETAILED DESCRIPTION

Figure 1:
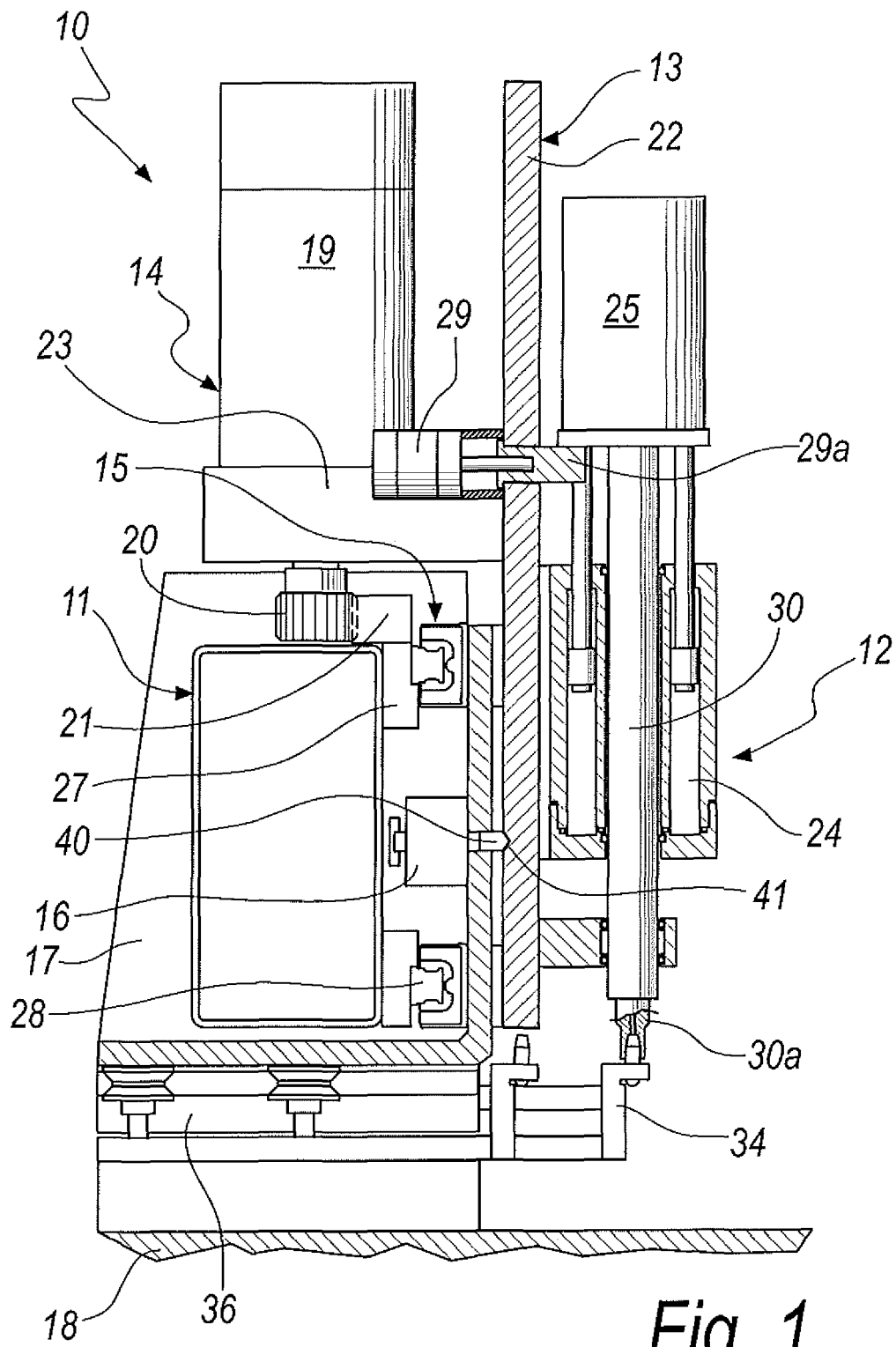
FIG. 1 is a partially sectional side view of the device according to the invention.
Figure 2:
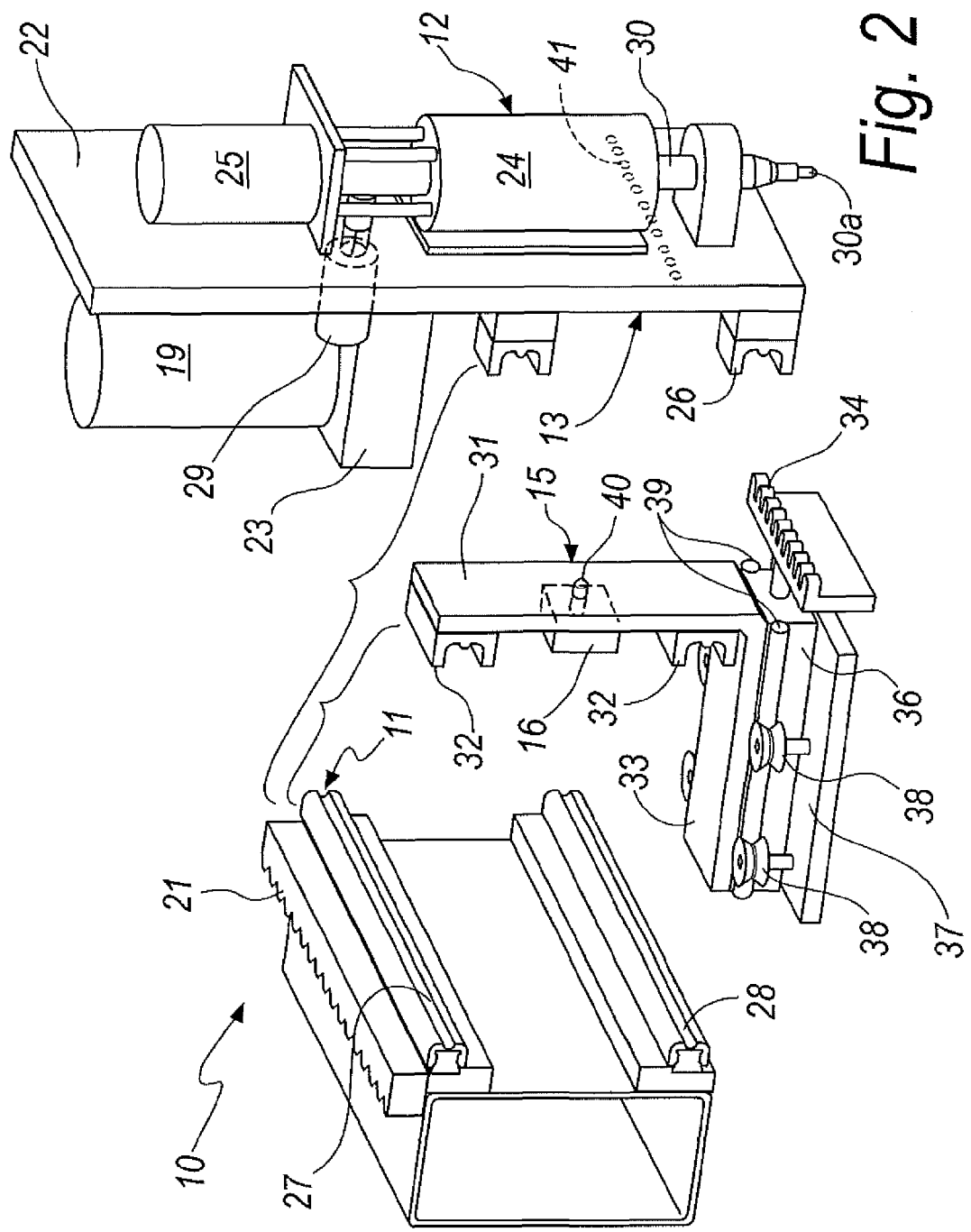
FIG. 2 is an exploded perspective view of the device according to the invention.

With reference to the figures, a tool changing device for a cutting head of a machine for cutting flat glass sheets is generally designated by the reference numeral 10.

The device 10 comprises, so that they can slide in a parallel arrangement with sliding means on a bridge 11 that supports a cutting head 12, a carriage 13 for supporting the cutting head 12, provided with motorization means 14 for translational motion on the bridge 11, and a tool supporting slider 15, which is normally coupled, by way of reversible fixing means 16 for detachably fixing the tool supporting slider 15 to the carriage 13, to the carriage 13 during the work of the cutting head 12 and which can be uncoupled, for tool changing operations, in order to allow the movement of the carriage with respect to the slider, which is stationary, to select a tool to be used.

The bridge 11 is understood to be laterally supported by abutments 17 which are associated with a worktable 18.

The means for the sliding of the carriage 13 on the bridge 11 are constituted by an electric motor 19, which is supported by a bracket 23 that is jointly connected to the carriage 13, with a pinion 20 engaged with a rack 21 which is fixed to the bridge 11.

The carriage 13 for supporting the head 12 is constituted by a supporting plate 22, which is substantially perpendicular with respect to the worktable 18, which is normally horizontal, the cutting head 12 with the respective means for moving the tool being fixed to the plate 22 at one end, i.e. an actuator 24 for the vertical translational movement of the end 30a to which the tool is fixed, and a motor 25 for the rotation of such end, and at the opposite side, on the bridge side, at least four sliders 26 for sliding on corresponding rails 27 and 28 associated with the bridge 11, as well as stroke limiting means 29 for the vertical actuator 24, which are designed to measure the lowering of the end 30a of the stem 30 of the cutting head for tool changing operations, described in more detail hereinbelow.

The tool supporting slider 15 is constituted by a bracket 31 which is L-shaped, the vertical section of which has two second sliders 32, which are arranged so as to slide on the rails 27 and 28, each interposed between two first sliders 26 of the carriage 13 which can slide on the same rail.

The horizontal portion 33 of the L-shaped bracket 31 carries a rack 34 for supporting tools 35, which is moved in a sliding fashion by means of an actuator 36 which is fixed below the horizontal portion 33.

The tool supporting rack 34 is moved by a stem 36a of the actuator 36, and is supported by means of a frame 37 to which it is fixed, the frame 37 being provided with sliding wheels 38 which are associated with corresponding guides 39 which are fixed to the actuator 36 and are therefore jointly connected to the bracket 31.

The reversible fixing means 16 for detachably fixing the tool supporting slider 15 to the carriage 13, are constituted by an actuator which is fixed to the vertical portion of the bracket 31, with a tip 40 which can be extracted and retracted for engagement or disengagement with respect to a hole 41 chosen among a series of holes formed in the face of the supporting plate 22 that is directed toward the bridge 11.

There are at least as many holes 41 as the number of tools carried by the tool supporting rack 34.

The tools 35, which are understood to be known per se, with clip bodies for quick and reversible engagement in a corresponding seat formed in the end 30a of the cutting head 12, and since they are known they are not shown for simplicity, have two lateral symmetric hollows 44, which are extended at right angles with respect to the vertical direction of movement of the stem 30 of the cutting head and are designed to slide on complementary shaped protrusions 45 which protrude laterally from teeth 47 in compartments 46 of the rack 34.

The stroke limit means 29 for the vertical actuator 24, which are designed to measure the lowering of the end 30a of the stem 30 of the cutting head for tool changing operations, are constituted by a fluid-operated actuator designed to produce the translational motion of a piston 19a.

When the stem 30 needs to be lowered for the tool to be changed, the fluid-operated actuator is commanded to extract the piston 19a to protrude from the plate 22 until it affects the downward stroke of the motor 25, to which the stem 30 is fixed.

When the stem 30 needs to be lowered until the tool is brought to the worktable 18, then the fluid-operated actuator is actuated to retract, so freeing the vertical motion of the motor 25 to which the stem 30 is fixed.

The operation of the tool changing device 10 according to the invention is as follows, and is illustrated in the Figures from 5 to 14.

Figure 5:
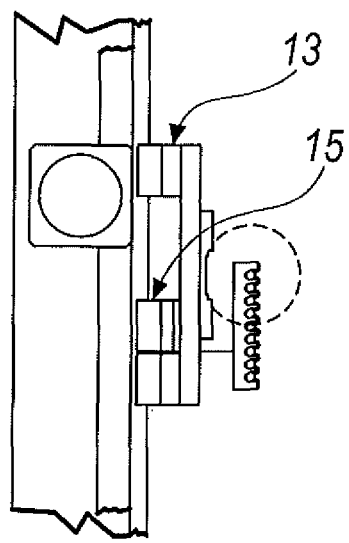
FIGS. 5 to 14 each schematically show a step in the tool changing operation.
Figure 6:
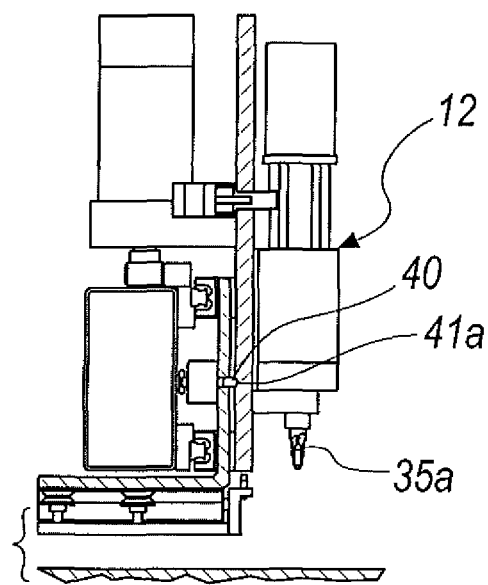

A first step of the tool changing operations is shown in FIGS. 5 and 6.

In this first, illustrative, step, the slider 15 is jointly connected to the carriage 13, and therefore the tip 40, which is jointly connected to the slider 15, is inserted into a first hole 41a formed in the plate 22 of the carriage 13.

The slider 15 is fixed in a first relative position with respect to the carriage 13.

It is assumed that the cutting head 12 has a first tool 35a in use and that it needs to uncouple it.

Figure 7:
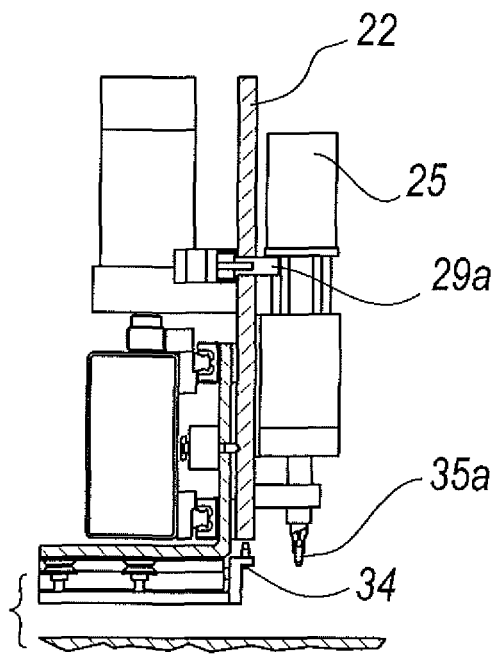

In FIG. 7 the piston 29a can be seen extracted so as to interfere with the downward stroke of the motor 25. The position of the piston 29a on the plate 22 determines a stroke of the motor 25 which is such as to lower the tool 35a to the height of the tool supporting rack 34.

Figure 3:
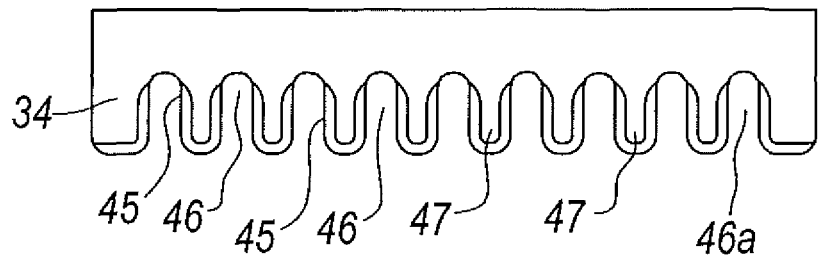
FIG. 3 is a top view of a detail of the device according to the invention.
Figure 4:
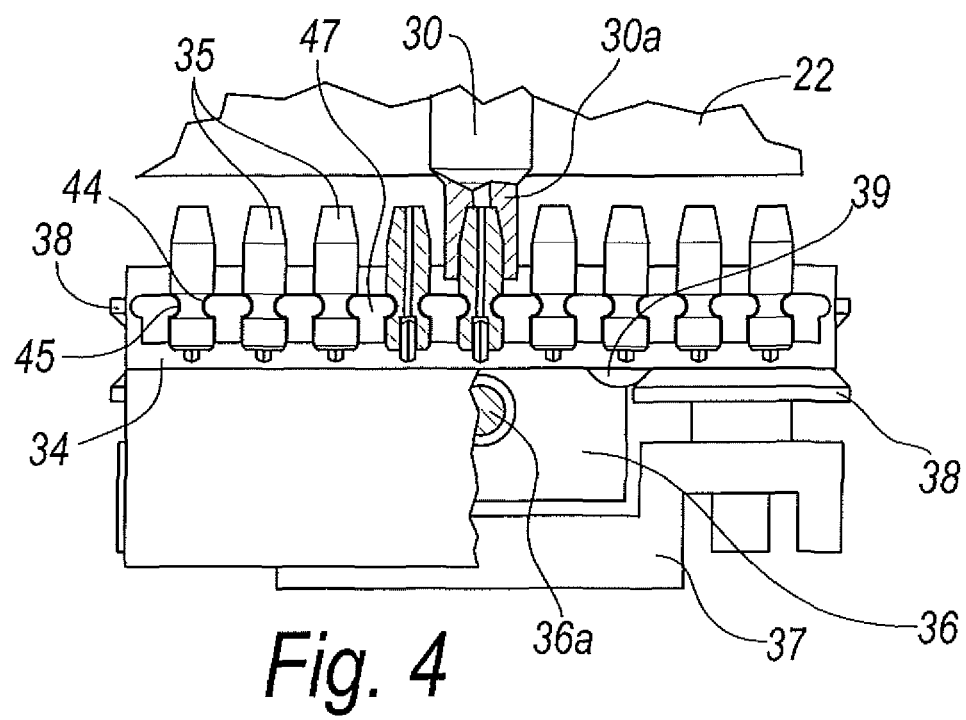
FIG. 4 is a partially sectional front elevation view of a part of the tool supporting slider.
Figure 8:
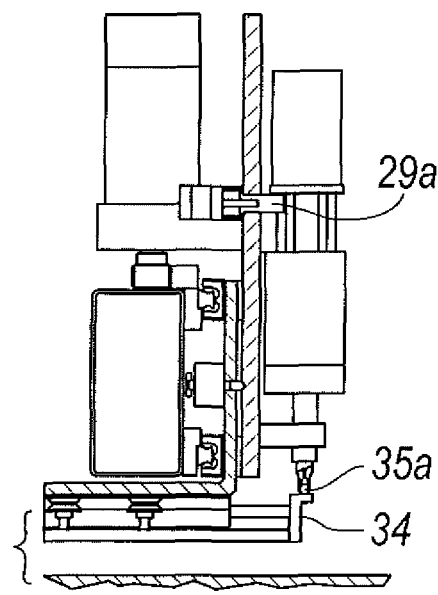

FIG. 8 shows the sliding movement of the tool supporting rack 34, and this sliding movement ensures that the corresponding prearranged compartment, which is designated by the reference numeral 46a in order to identify it by way of example with respect to the other similar compartments 46 of the rack 34 shifts until the protrusions 45 protruding on it couple with the corresponding hollows 44 of the tool 35a, the compartment 46a, the protrusions 45 and the hollows 44 being shown in FIGS. 3 and 4.

Figure 9:
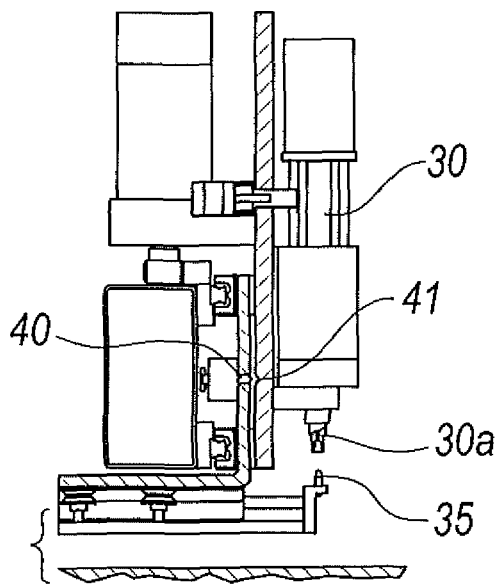

The subsequent operation of lifting the stem 30 determines the rapid detachment of the first tool 35a from the end 30a, as in FIG. 9.

Also in FIG. 9 the tip 40 is shown retracted from the hole 41. This configuration of the tip frees the slider 15 from the carriage 13, allowing the latter to move with respect to the slider itself as shown in FIG. 10.

Figure 10:
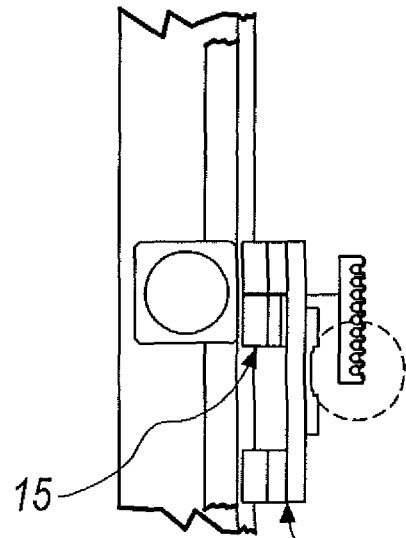

With the slider 15 stationary, the carriage 13, now freed from the slider, moves to a second position, for example to load the second tool 35b, which is arranged at the other end of the rack 34 with respect to the first tool 35a, as shown in FIG. 10, the first tool 35a and the rack 34 being shown for example in FIGS. 7 and 8, and the second tool 35b being shown by way of example in FIGS. 11 to 14.

Figure 11:
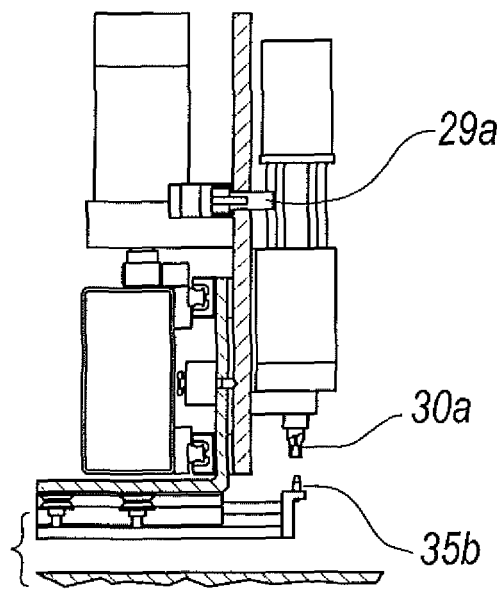

The end 30a remains lifted and the piston 29a remains extracted, as shown in FIG. 11.

Figure 12:
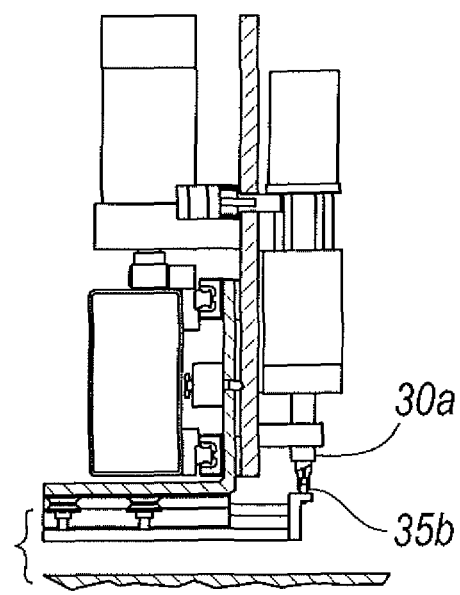

FIG. 12 shows the end 30a lowered to engage the second tool 35b, with the motor 25, shown for example in FIG. 7, which is in abutment at its stroke limit against the piston 29a, already shown in FIG. 11.

Figure 13:
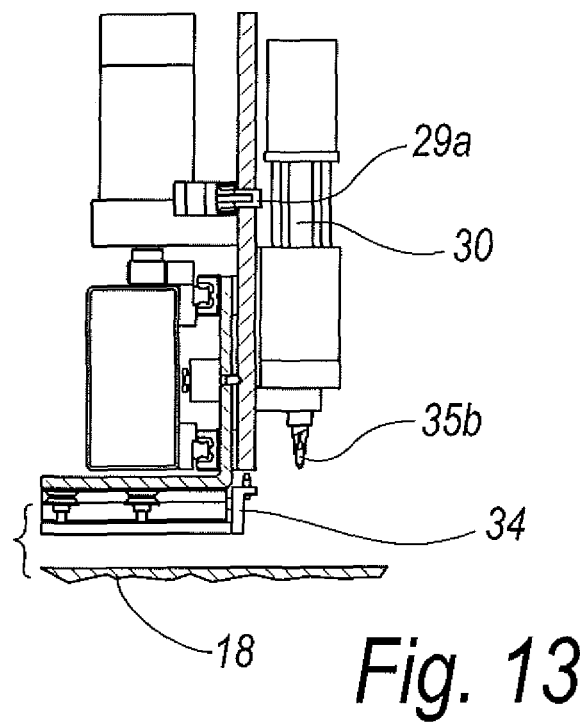
Figure 14:
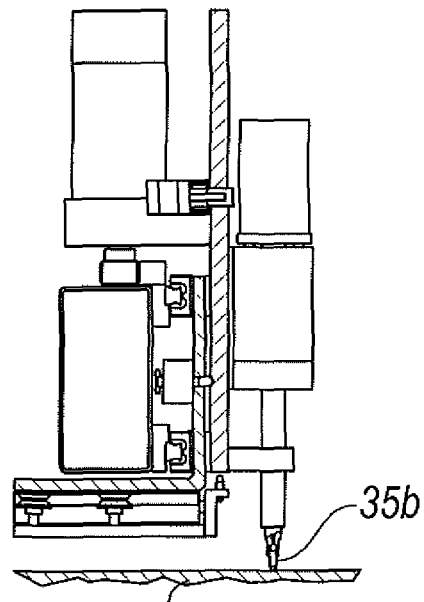

FIG. 13 shows the rack 34 which retracts, the stem 30 with the new tool 35b which raises and the piston 29a which retracts in order to permit the lowering to the level of the worktable 18, such situation being shown in FIG. 14.

In practice it has been found that the invention fully achieves the intended aim and objects.

In particular, with the invention a tool changing device has been developed which makes it possible to eliminate fruitless idle excursions to arrive at the tool changing region, since the slider 15 with the tool supporting rack 34 travels with the carriage 13 that carries the cutting head 12, and long excursions are not necessary for the cutting head to reach magazines which are fixed at the edges of the worktable. This improves the production rates of the cutting machine of which the device is a part.

Moreover, with the invention a tool changing device has been developed in which the translational movement of the slider with the tool supporting rack with respect to the cutting head supporting carriage to change the tool is executed by the same motor that moves the cutting head with respect to the bridge, without the addition of other motors.

Further, the tip 40 of the reversible fixing means 16 is controlled by position sensors which enable a correct mechanical alignment between the tool supporting rack and the cutting head before and during every tool change.

The device according to the invention makes it possible to resolve all the above-mentioned problems concerning current, fixed-position tool changing systems.

The tool change is thus extremely simple, precise, i.e. always mechanically aligned, and extremely rapid.

The invention thus conceived is susceptible of numerous modifications and variations, all of which are within the scope of the appended claims. Moreover, all the details may be substituted by other, technically equivalent elements.

In practice the materials employed, as well as the dimensions and the contingent shapes, may be any according to requirements and to the state of the art.

The disclosures in Italian Patent Application No. PD2009A000315 from which this application claims priority are incorporated herein by reference.

The invention claimed is:

1. A tool changing device for a cutting head of a machine for cutting flat glass sheets, the tool changing device comprising:
   a bridge;
   a carriage for supporting the cutting head, the carriage being slidingly attached to the bridge for translation along the bridge;
   a motor that provides for translation of the carriage with respect to the bridge;
   a tool supporting slider configured to support a plurality of tools such that the tools can be automatically exchanged between the tool supporting slider and the cutting head via a direct exchange;
   wherein during cutting, the tool supporting slider is coupled, by way of reversible fixing means for detachably fixing the tool supporting slider to the carriage, to said carriage, and
   wherein during a tool exchanging operation between the tool supporting slider and the carriage, the reversible fixing means and the tool supporting slider are uncoupled from said carriage, in order to allow for movement of said carriage with respect to the tool supporting slider, which tool supporting slider is stationary during the tool exchanging operation, so as to allow for a tool to be selected by the cutting head from the plurality of tools on the tool supporting slider.

2. The tool changing device according to claim 1, wherein said motor is an electric motor that is supported by a bracket that is jointly connected to the carriage, the bracket further supporting a pinion that engages a rack that is fixed to the bridge.

3. The tool changing device according to claim 1, wherein said carriage is constituted by:
   a supporting plate;
   the cutting head;
   means for moving the selected tool, which are fixed to an end of said supporting plate;
   four first sliders for sliding on first and second guide rails fixed to the bridge, wherein two first sliders engage each of the first and second guide rails; and
   stroke limiting means designed to measure a lowering of an end of a stem of the cutting head for tool exchanging operations, wherein the stroke limiting means are fixed to an end of said supporting plate on a supporting plate face that is directed toward the bridge.

4. The tool changing device according to claim 3, wherein said tool supporting slider is constituted by:
   an L-shaped bracket having two second sliders, which are arranged for sliding on said first and second guide rails, wherein one second slider is disposed between the two first sliders engaging the first guide rail and one second slider is disposed between the two first sliders engaging the second guide rail, the L-shaped bracket further supporting a rack for holding the plurality of tools, the rack being moveable in a sliding fashion by means of a first actuator.

5. The tool changing device according to claim 4, wherein said rack is moved by a stem of the first actuator, the first actuator being supported by means of a frame to which it is fixed, said frame being provided with sliding wheels which are associated with corresponding guides which are fixed to the first actuator.

6. The tool changing device according to claim 4, wherein said reversible fixing means for detachably fixing the tool supporting slider to the carriage are constituted by:
   a second actuator which is fixed to the bracket; and
   a tip which can be extracted and retracted for engagement or disengagement with respect to a hole chosen among a series of holes formed in the supporting plate face that is directed toward the bridge.

7. The tool changing device according to claim 4, wherein the plurality of tools, designed for quick and reversible engagement with the cutting head, each have two symmetric hollows that are designed to slide on complementary shaped protrusions which protrude from teeth found in each compartment of the rack.

8. The tool changing device according to claim 3, wherein said stroke limiting means are constituted by a fluid-operated third actuator designed to produce translational motion of a piston,
   wherein the piston protrudes from the supporting plate until it affects a downward stroke of the motor when the stem of the cutting head is to be lowered for the tool exchanging operation, and
   wherein the piston retracts, thereby freeing the vertical motion of the motor, when the stem of the cutting head is to be lowered until the selected tool is brought down to a worktable.

9. A tool changing device for a cutting head of a machine for cutting flat glass sheets, the tool changing device comprising:
   a bridge having first and second guide rails;
   a carriage for supporting the cutting head, the carriage having sliders that slidingly engage the first and second guide rails;
   a motor that provides for translation of the carriage with respect to the bridge;
   a tool supporting slider having further sliders that also slidingly engage the first and second guide rails;
   wherein during cutting, the tool supporting slider is coupled, by way of reversible fixing means, to said carriage, the reversible fixing means comprising a tip which can be extended and retracted for engagement and disengagement to a chosen hole among a series of holes formed on a face of the carriage, and
   wherein during a tool exchanging operation, the tool supporting slider is uncoupled from said carriage, in order to allow for movement of said carriage with respect to the tool supporting slider, which tool supporting slider is stationary during the tool exchanging operation, so as to allow for a tool to be selected by the cutting head from a tool supporting rack on the tool supporting slider.

* * * * *